3,220,985
MODIFYING HYDROCARBON POLYMERS
David S. Breslow, Wilmington, Del., assignor to Hercules Powder Company, Wilmington, Del., a corporation of Delaware
No Drawing. Filed Oct. 15, 1962, Ser. No. 230,681
9 Claims. (Cl. 260—79.3)

This invention relates to a process of modifying polymers and to the polymers so modified. In particular, this invention relates to a process of modifying hydrocarbon polymers with monosulfonazides and to the polymers so modified.

Recent improvements in the art of polymerization have enabled the production of a large number of hydrocarbon polymers having a variety of uses. All of these polymers, while excellent for many uses, are difficult to dye, emulsify, adhere to other materials, etc. It has been hypothesized that the reason for these difficulties is the lack of polar groups in the polymers.

Now in accordance with this invention, it has been found that hydrocarbon polymers can be modified by heating in the presence of a monosulfonazide having the formula $$RSO_2N_3$$

where R is an organic radical to produce products having increased susceptibility toward the application of dyes, coatings, adhesives, as well as improved printability and emulsifiability. The modification of this invention is particularly advantageous in the preparation of hydrocarbon polymer films and fibers of improved dyeability. It has also been found that hydrocarbon polymers modified in accordance with this invention make excellent lubricant additives. In addition, it is possible by means of this invention to bond, directly to hydrocarbon polymers, dyes, stabilizers, flameproofing agents, antistatic agents, ultraviolet screening agents, etc., which could otherwise not be used. This can be done by using a compound which, in addition to the color, stability, etc., causing grouping, has been synthesized to contain a sulfonazide grouping.

Any monosulfonazide, as defined above, can be used in the process of this invention. Exemplary of the monosulfonazides that can be used are the aliphatic monosulfonazides such as 1-pentane sulfonazide, 1-decane sulfonazide, etc.; the halogenated aliphatic monosulfonazides such as 3-chloropropane sulfonazide, etc.; the cyano aliphatic monosulfonazides such as 3-cyanopropane sulfonazide, etc.; the hydroxy aliphatic monosulfonazides such as 4-hydroxybutane sulfonazide, etc.; the cyclo aliphatic monosulfonazides such as cyclohexane sulfonazide, etc.; the aromatic monosulfonazides such as p-toluene sulfonazide, p-dimethylamino phenyl sulfonazide, m-benzoyl phenyl sulfonazide, m-nitrobenzene sulfonazide, m-carboxybenzene sulfonazide, p-acetamidobenzene sulfonazide, p-phenylazobenzene sulfonazide, etc.; the heterocyclic monosulfonazides such as 2-thiophene sulfonazide, 3-pyridine sulfonazide, etc. Most preferably, functional groups will be attached to aromatic monosulfonazides in the meta- or para-positions. The only restriction on the type of sulfonazide modifying agent used in the process of this invention is that it be substituted with only one sulfonazide group.

Any type of hydrocarbon polymer, including saturated, unsaturated, linear atactic, crystalline or nonlinear amorphous polymers as, for example, polyethylene, polypropylene, polystyrene, styrene-butadiene rubber, butyl rubber, natural rubber, polybutadiene, polyisobutylene, ethylene-propylene copolymer, cis - 1,4 - polyisoprene, ethylene-propylene-dicyclopentadiene terpolymer, etc., and blends of these polymers with each other or nonhydrocarbon polymers can be modified in accordance with this invention. The hydrocarbon polymer to be modified can be in any desired form, as for example, flake, fiber, film, etc.

The modification process of this invention can be carried out by heating the hydrocarbon polymer in the presence of the monosulfonazide to a temperature at which the sulfonazide decomposes. This temperature varies over a wide range but, in general, will be from about 90° C. to about 300° C. Various amounts of the monosulfonazide modifying agent can be added, the optimum amount depending on the desired degree of modification, the specific monosulfonazide employed, etc. In general, the amount added, based on the weight of the hydrocarbon polymer, will be from about 0.001% to about 20%.

The monosulfonazide modifying agent can be incorporated with the hydrocarbon polymer in any desired fashion. For some applications, it may be desirable to blend the modifier and hydrocarbon polymer. In such cases, a uniform blend can be obtained by simply milling in a conventional rubber mill or dissolving the monosulfonazide in a solution containing the polymer and evaporating the solvent. For other applications, a surface modification of the polymer may be all that is desired. In such cases, the polymer to be treated can be dipped into a solution of the monosulfonazide or a solution of the monosulfonazide can be spread or painted on the surface of the polymer. Other methods of blending the modifying agent with the polymer or coating the surface of the polymer with the modifying agent will be apparent to those skilled in the art.

In addition to the modifying agent, other ingredients can also be incorporated as, for example, extenders, fillers, pigments, plasticizers, stabilizers, etc. Obviously there are many cases in which other additives are not required or desired and excellent results are achived when only the modifying agent is added.

The following examples are presented for purposes of illustration, parts and percentages being by weight unless otherwise specified. The molecular weight of some of the polymers in the examples is indicated by their reduced specific viscosity (RSV). By the term "reduced specific viscosity" is meant the $\eta_{sp/c}$ determined on a 0.1% solution (0.1 g. of the polymer per 100 ml. of solution) of the polymer in decahyronaphthalene at a temperature of 135° C.

*Example 1*

A sample of finely divided polypropylene having an RSV of 3.0 was slurried in acetone. To this slurry was added sufficient p-toluene sulfonazide to give a mixture containing 2% by weight of sulfonazide, based on the weight of the polymer. The acetone diluent was evaporated at room temperature with agitation. The resulting mixture was heated at a temperature of 160° C. for 2 hours under an atomsphere of nitrogen. The product was then extracted with acetone to remove any unreacted materials. The modified polymer product looked the same as the untreated polymer and had the same RSV. It was analyzed for sulfur to determine the amount of modification. The results of this analysis showed that it contained 0.27% by weight of sulfur. Samples of the modified polymer and the unmodified polymer from which it had been prepared were pressed into films of 8 mil thickness. Squares cut from each film were separately tested for adherence when bonded together with an epoxideamine resin adhesive. The squares were spread with adhesive, clamped together and cured at 105° C. for 30 minutes. Each bonded sample was then tested for stripping peel strength (ASTM D903–49). The bonded sample of modified polymer had a stripping peel strength of 0.44 lb. per inch width, while the bonded sample of unmodified polymer had a strength of 0.04 lb. per inch width.

*Example 2*

The sample of polypropylene described in Example 1 was blended with 2%, based on the weight of the polymer, of 3-pyridine sulfonazide as described in Example 1 and modified by heating for 2 hours at 150° C., also as described in Example 1. The resulting modified polymer contained 0.17% by weight of sulfur and showed improved susceptibility to acid dyes.

*Example 3*

A sample of polyisobutylene having an average molecular weight of approximately 10,800 was dissolved in methylene chloride. To this solution was added sufficient p-toluene sulfonazide to give a mixture containing 8% by weight of the sulfonazide, based on the weight of the polymer. The methylene chloride diluent was evaporated at room temperature. The resulting mixture was heated at a temperature of 150° C. for 8 hours under an atmosphere of nitrogen. The product was then extracted with acetone to remove any unreacted materials. The resulting modified polymer contained 0.1% nitrogen and was found to be useful as a lubricant additive.

*Example 4*

A 2 x 4 inch woven swatch of polypropylene fibers having an RSV of 3.8 was thoroughly washed, rinsed in distilled water and dried. The dried swatch was then soaked in a 15% solution of 1-pentane sulfonazide in methylene chloride for 5 hours at room temperature. The thus treated swatch was air dried and then heated in an autoclave in an atmosphere of nitrogen for 5 hours at a temperature of 150° C. under a pressure of 50 p.s.i. The swatch was extracted with methylene chloride to remove any unreacted materials. After drying, the modified material was analyzed and found to contain 0.26% by weight of sulfur. The modified material dissipated an electric charge more rapidly than an untreated swatch.

What I claim and desire to protect by Letters Patent is:

1. A process of modifying a hydrocarbon polymer which comprises heating said polymer in admixture with from about 0.001% to about 20%, based on the weight of the polymer of a monosulfonazide having the formula $$RSO_2N_3$$

where R is an organic radical inert to the modification reaction.

2. The process of claim 1 wherein the hydrocarbon polymer is polypropylene.
3. The process of claim 1 wherein the hydrocarbon polymer is polyisobutylene.
4. The process of claim 1 wherein the monosulfonazide is p-toluene sulfonazide.
5. The process of claim 1 wherein the monosulfonazide is 3-pyridine sulfonazide.
6. The process of claim 1 wherein the monosulfonazide is 1-pentane sulfonazide.
7. A hydrocarbon polymer modified by treating with from about 0.001% to about 20%, based on the weight of the polymer of a monosulfonazide having the formula $$RSO_2N_3$$

where R is an organic radical inert to the modification reaction.

8. The product of claim 7 wherein the hydrocarbon polymer is polypropylene.
9. The product of claim 7 wherein the hydrocarbon polymer is polyisobutylene.

References Cited by the Examiner
UNITED STATES PATENTS 3,058,944 10/1962 Breslow et al. _____ 260—79.3
3,075,950 1/1963 Newland et al. _____ 260—94.9

JOSEPH L. SCHOFER, *Primary Examiner.*